(12) United States Patent
Santos et al.

(10) Patent No.: US 10,890,931 B2
(45) Date of Patent: *Jan. 12, 2021

(54) MEMORY MODULE THERMAL MANAGEMENT

(71) Applicant: INTEL CORPORATION, Santa Clara, CA (US)

(72) Inventors: Ishmael Santos, Milpitas, CA (US); Corinne Hall, Hillsboro, OR (US); Christopher Cox, Placerville, CA (US)

(73) Assignee: INTEL CORPORATION, Santa Clara, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/723,155

(22) Filed: Oct. 2, 2017

(65) Prior Publication Data

US 2018/0120871 A1  May 3, 2018

Related U.S. Application Data

(63) Continuation of application No. 12/942,091, filed on Nov. 9, 2010, now Pat. No. 9,778,664, which is a continuation of application No. 11/589,622, filed on Oct. 30, 2006, now Pat. No. 7,830,690.

(51) Int. Cl.
*G05D 23/19* (2006.01)

(52) U.S. Cl.
CPC .................................... *G05D 23/19* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,685,081 A * | 8/1987 | Richman | ............... | G11C 19/085 257/713 |
| 7,830,690 B2 * | 11/2010 | Santos | ................... | G05D 23/19 365/1 |
| 7,901,131 B2 * | 3/2011 | Bash | ...................... | G01K 1/026 374/4 |
| 2006/0221741 A1 * | 10/2006 | Jain | ........................ | G01K 7/425 365/211 |
| 2007/0140030 A1 * | 6/2007 | Wyatt | ...................... | G11C 5/00 365/212 |
| 2008/0052483 A1 * | 2/2008 | Rangarajan | ............. | G06F 1/206 711/170 |

* cited by examiner

*Primary Examiner* — Zandra V Smith
*Assistant Examiner* — Andre C Stevenson
(74) *Attorney, Agent, or Firm* — Kacvinsky Daisak Bluni PLLC

(57) ABSTRACT

A method is disclosed for implementing a scheme to configure thermal management control for a memory device resident on a memory module for a computing platform. A method is also disclosed for implementing the configured thermal management control. In a run-time environment for a computing platform a temperature is obtained from a thermal sensor monitoring the memory module. The memory module is in a given memory module with thermal sensor configuration that includes the memory device. An approximation of a temperature for the memory device is made based on thermal information associated with the given configuration of the memory module and the obtained temperature. The configured thermal management control for the memory device is implemented based on the approximated temperature. Other implementations and examples are also described in this disclosure.

19 Claims, 6 Drawing Sheets

Configuration 300 Thermal Characteristics

| Memory Device | Minimum Offset °C | Maximum Offset °C | Theta °C/W |
|---|---|---|---|
| 160A | 4.0 | 7.0 | 1.2 |
| 160B | 3.0 | 8.0 | 2.5 |
| 160C | 3.1 | 7.5 | 1.1 |
| 160D | 3.3 | 5.0 | 0.4 |

Table 410

Default Thermal Characteristics

| Memory Device | Minimum Offset °C | Maximum Offset °C | Theta °C/W |
|---|---|---|---|
| Default | 4.0 | 8.0 | 1.5 |

Table 420

*Fig. 4*

MEMORY MODULE THERMAL MANAGEMENT

RELATED APPLICATIONS

This application is a continuation of, claims the benefit of and priority to previously filed U.S. patent application Ser. No. 12/942,091 filed Nov. 9, 2010, which is a continuation of U.S. patent application Ser. No. 11/589,622 filed Oct. 30, 2006, now U.S. Pat. No. 7,830,690 issued Nov. 9, 2010 and is related to commonly assigned U.S. patent application Ser. No. 10/955,154, filed by Sandeep Jain, Animesh Mishra, Jun Shi, Pochang Hsu and David Wyatt on Sep. 30, 2004, now U.S. Pat. No. 7,356,426 issued on Apr. 8, 2008 and entitled "Calibration of Thermal Sensors for Semiconductor Dies" all of which are herein incorporated by reference in their entirety.

BACKGROUND

Cooling constraints are typical challenges faced in a computing platform operating environment. These cooling constraints may be increased in a compact or mobile computing platform. Among the components that are likely impacted by these cooling constraints is memory for the computing platform. This memory may include one or more memory devices that reside in the computing platform on one or more memory modules such as dual in-line memory modules (DIMMs) or small outline DIMMS (SO-DIMMs). Typically, to operate a computing platform at a high level of efficiency and/or prevent damage to memory devices, accurate temperatures of memory devices are desirable.

BRIEF DESCRIPTION OF THE DRAWINGS

FIG. 4 provides tables to depict example thermal characteristics of a given memory module with thermal sensor configuration and default thermal characteristics;

DETAILED DESCRIPTION

As mentioned in the background, cooling constraints are a challenge in compact or mobile computing platforms and accurate temperatures of memory devices are important to meet these challenges. Maximum or high point memory case temperatures are typically associated with a buffer or "guard band" to ensure maximum memory device temperatures are not exceeded. Typically, the more accurate an obtained memory device temperature is the more efficient and less prone to failure the memory device can be. This accuracy can lead to a smaller or narrower guard band and thus a memory device can reach higher temperatures before thermal management controls are activated (e.g., memory access throttling). But the cost and added complexity of placing thermal sensors directly on each memory device to increase that accuracy can be problematic.

In one example a scheme is implemented to configure thermal management control for a memory device resident on a memory module for a computing platform. In a run-time environment, for example, the configured thermal management control is implemented. In one example, a temperature is obtained from a thermal sensor monitoring the memory module. The memory module, for example, is in a given memory module with thermal sensor configuration that includes the memory device. An approximation of a temperature for the memory device, for example, is made based on thermal information associated with the given configuration of the memory module and the obtained temperature. According to this example, the configured thermal management control for the memory device is implemented based on the approximated temperature.

Figure 1:
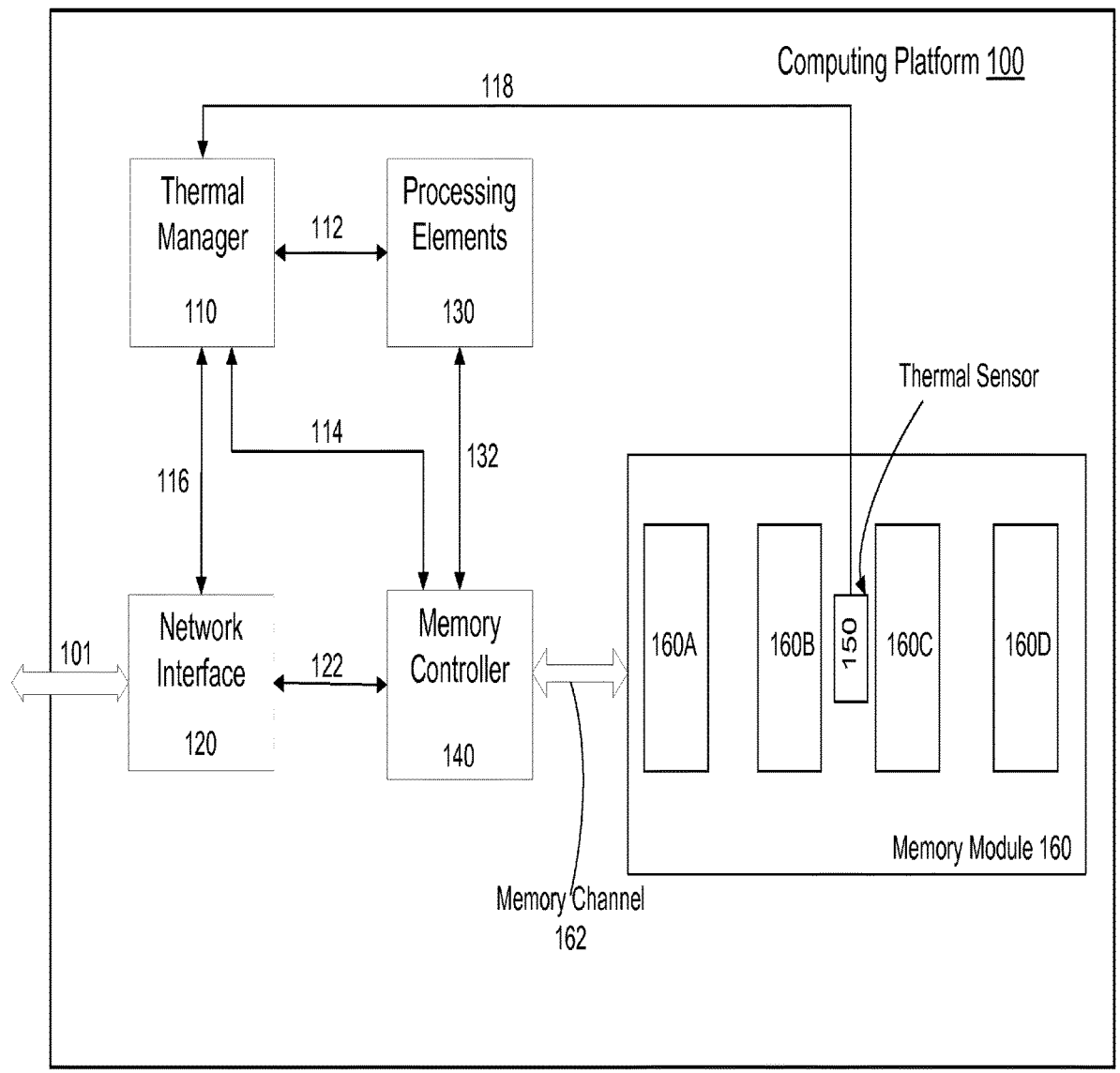
FIG. 1 is an illustration of elements of an example computing platform.

FIG. 1 is an illustration of elements of an example computing platform 100. In one example, as depicted in FIG. 1, computing platform 100 includes thermal manager 110, network interface 120, processing elements 130, memory controller 140, thermal sensor 150 and memory module 160. Although not shown in FIG. 1, computing platform 100 may also include other hardware, software, firmware or a combination of these elements and be a part of a computing device. This computing device may be an ultra mobile computer (UMC), a notebook computer, a laptop computer, a tablet computer, a desktop computer, a digital broadband telephony device, a digital home network device (e.g., cable/satellite/set top box, etc.), a personal digital assistant (PDA), single blade computer in a chassis and/or rack, a server and the like.

In one example, as described more below, thermal manager 110 implements a scheme to configure thermal management control for one or more memory devices 160A-D resident on memory module 160 for computing platform 100. In a run-time environment, for example, the configured thermal management control is implemented by features of thermal manager 110 and/or other elements of computing platform 100, e.g., memory controller 140 or processing elements 130.

In one example, thermal manager 110 is coupled to other elements of computing platform 100 via one or more communication links. These communication links, for example, are depicted in FIG. 1 as communication links 112, 114, 116 and 118. As described more below, thermal manager 110, for example, includes an appropriate interface to these other elements to implement or cause to be implemented the thermal management control of one or more memory devices 160A-D resident on memory module 160.

In one example, network interface 120 includes the interface via which computing platform 100 is coupled to a network via network link 101, e.g., a wired or a wireless local area network (LAN/WLAN), a wide area network (WAN/WWAN), a metropolitan area network (MAN), a personal area network (PAN) and a cellular or a wireless broadband telephony network. Network interface 120, for example, includes hardware, software or firmware to transmit and receive data to this network. This may include one or more network interface cards, or other elements to receive and transmit data via network link 101. In one example, communication link 122 may be used by network interface 120 elements to make memory read/write requests to memory controller 140. These requests may send/retrieve data to/from one or more memory devices 160A-D.

In one example, processing elements 130 include the software, hardware, and/or firmware to support one more processing operations on computing platform 100. This may include software such as operating systems and/or applications, hardware such as microprocessors, network processors, service processors, microcontrollers, field programmable gate arrays (FPGAs), application specific integrated circuit (ASICs) and firmware to include executable code to initiate basic input/output systems (BIOS) and/or initiate computing platform 100 elements for virtualization operations. In one example, communication link 132 may be used by processing elements 130 to make memory read/write requests to memory controller 140.

In one example, memory controller 140 handles/completes requests for data to be stored (written) and retrieved (read) into one or more memory devices 160A-D. For example, these requests may be received via communication links 122 or 132. In one implementation, memory controller 140 may throttle the rate at which these memory requests are handled (e.g., throttle memory bandwidth) based on approximated temperatures determined, for example, by thermal manager 110.

In one example, memory controller 140 may be integrated with an element of processing elements 130. For example, memory controller 140 may serve as an integrated memory controller for a microprocessor. In this example, thermal manager 110 may communicate with memory controller 140 through an interface coupled to processing elements 130 (e.g., via communication link 112) or through an interface coupled directly to an integrated memory controller 140 (e.g., via communication link 132).

In one example, as depicted in FIG. 1, memory module 160 includes memory devices 160A-D. In one implementation, these memory devices 160A-D and memory module 160 couple to memory controller 140 through at least one memory channel (e.g., including data transmit and data receive communication links). An example of this coupling is depicted in FIG. 1 and includes memory channel 162. Data to be written to or read from each memory device is routed through memory channel 162, for example, via a serial communication link or via a plurality of parallel communication links. This disclosure is not limited to only a single memory module with four memory devices as shown in FIG. 1, but may include any number of memory modules and may also include any number of memory devices and memory channels.

Figure 2:
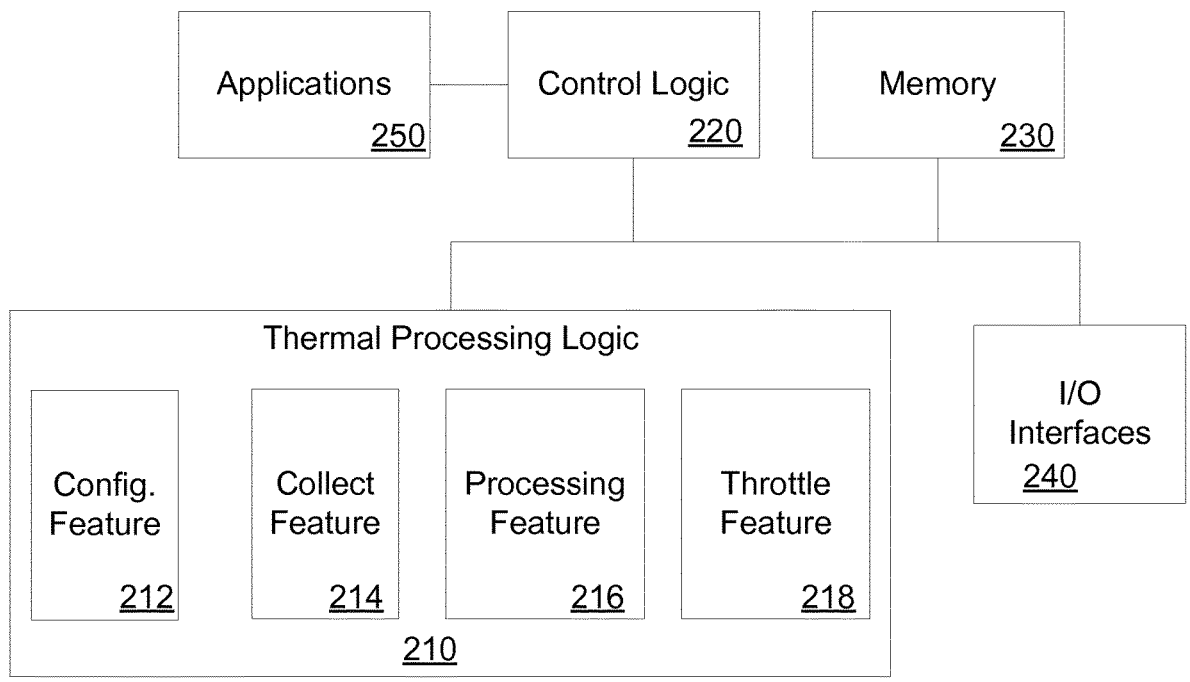
FIG. 2 provides a block diagram of an example thermal manager architecture.

FIG. 2 provides a block diagram of an example thermal manager 110 architecture. In FIG. 2, thermal manager 110's example architecture includes thermal processing logic 210, control logic 220, memory 230, input/output (I/O) interfaces 240 and optionally one or more applications 250.

In one example, the elements portrayed in FIG. 2's block diagram are those elements to support or enable thermal manager 110 as described in this disclosure, although a given thermal manager may include some, all or more elements than those depicted in FIG. 2. For example, thermal processing logic 210 and control logic 220 may each or collectively represent a wide variety of logic device(s) or executable content to implement the features of thermal manager 110. These logic device(s) may include a microprocessor, network processor, service processor, microcontroller, FPGA, ASIC, sequestered thread or core of a multi-core/multi-threaded microprocessor, special operating mode of a processor (e.g., system management mode) or combination thereof.

In FIG. 2, thermal processing logic 210 includes configuration feature 212, collect feature 214, processing feature 216 and throttle feature 218. In one implementation, thermal processing logic 210 uses these features to perform several operations. These operations include, for example, configuring thermal management control for a memory device resident on a memory module, collecting or obtaining a temperature from a thermal sensor on the memory module to approximate a temperature for the memory device and throttling or cause to be throttled memory accesses and/or power to the memory device based on the approximated temperature.

Control logic 220 may control the overall operation of thermal manager 110 and as mentioned above, may represent any of a wide variety of logic device(s) or executable content to implement the control of thermal manager 110. In an alternate example, the features and functionality of control logic 220 are implemented within thermal processing logic 210.

In one example, memory 230 stores executable content. The executable content may be used by control logic 220 and/or thermal processing logic 210 to implement or activate features or elements of thermal manager 110. As described in more detail below, memory 230 may also temporarily maintain thermal information associated with a given configuration of a memory module for computing platform 100. The thermal information, for example, may be obtained from one or more BIOS tables maintained by processing elements 130 (e.g., in firmware). The thermal information, for example, includes one or more characteristics of the given memory module configuration and also of a thermal sensor to monitor the memory module's temperature. As mentioned above and described more below, the thermal information may be used to approximate a temperature of a memory device resident on the memory module.

I/O interfaces 240 may provide an interface via a communication medium or link between thermal manager 110 and elements resident on computing platform 100. As mentioned above for FIG. 1, thermal manager 110 may couple to these elements via communication links 112, 114, 116 and 118. I/O interfaces 240, for example, include interfaces that operate according to various communication protocols to communicate over these communication links. For example, I/O interfaces 240 operate according to a communication protocol that is described in a specification such as the System Management Bus (SMBus) Specification, version 2.0, published August 2000, and/or later versions.

I/O interfaces 240 may also provide an interface to elements located remotely to computing platform 100. As a result, I/O interfaces 240 may enable thermal processing logic 210 or control logic 220 to receive a series of instructions from these elements. The series of instructions may enable thermal processing logic 210 and/or control logic 220 to implement one or more features of thermal manager 110.

In one example, thermal manager 110 includes one or more applications 250 to provide internal instructions to control logic 220 and/or thermal processing logic 210. Applications 250 may also include drivers to access BIOS information (e.g., thermal information) to implement at least a portion of the thermal management control for one or more memory devices resident on a memory module. These drivers, for example, may be provided by processing elements 130, e.g., from a firmware hub or from an operating system (OS).

Figure 3:
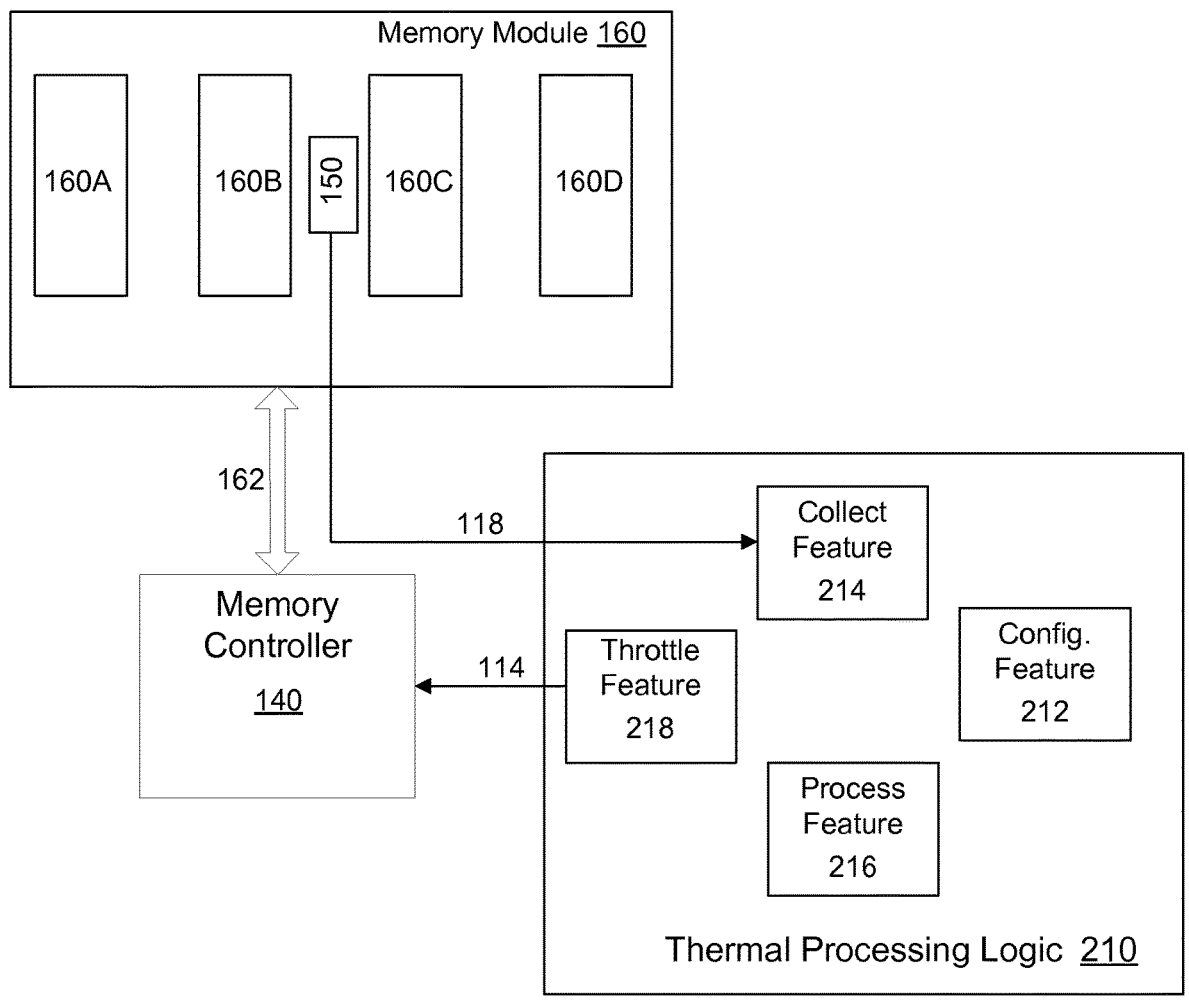
FIG. 3 is an illustration of an example configuration for a memory module on the computing platform.

FIG. 3 is an illustration of an example configuration 300 for memory module 160 on computing platform 100. In one example, configuration 300 for memory module 160 as shown in FIG. 3 is substantially the same configuration depicted in FIG. 1 for memory module 160. Similar to FIG. 1, in one example, FIG. 3 depicts memory module 160 with memory devices 160A-D and thermal sensor 150. Memory module 160, for example, is coupled to memory controller 140 via memory channel 162 and thermal sensor 150 is coupled to logic features of thermal manager 110 via communication link 118. These couplings, for example, are also similar to the couplings in FIG. 1.

In one example, memory module 160 is a dual inline memory module (DIMM) and memory devices 160A-D are dynamic random memory access (DRAM) devices, although this disclosure is not limited to only this type of memory module and memory devices. In another example, memory module 160 may be a small outline DIMM (SO-DIMM) or a single in line memory module (SIMM). DRAM devices may include, but are not limited to, generations of double data rate (DDR) synchronous DRAM such as DDR (first generation), DDR2 (second generation) or DDR3 (third generation). Other types of memory may also include future generations of DDR or other memory technologies.

In one example, logic features of thermal manager 110 interact with thermal sensor 150 and memory controller 140 to implement thermal management control for one or more memory devices 160A-D resident on memory module 160. These logic features of thermal manager 110, for example, are logic features of thermal processing logic 210. As depicted in FIG. 3, these logic features include configuration feature 212, collect feature 214, processing feature 216 and throttle feature 218. As mentioned above and described more below, in one example, the logic features depicted in FIG. 3 enable thermal manager 110 to implement or cause other elements/entities to implement thermal management control for memory devices 160A-D based on an approximated temperature. Causing to implement thermal management control, for example, includes relaying the approximated temperature to thermal management entities for or responsive to computing platform 100. These thermal management entities may be part of memory controller 140 or processing elements 130 (e.g., an OS).

As shown in FIG. 4, tables 410 and 420 list example thermal characteristics of a given memory module with thermal sensor configuration and default thermal characteristics, respectively. Thermal characteristics depicted in table 410, for example, are at least a portion of the thermal information associated with the given memory module with thermal sensor configuration and are collected and determined while a computing platform is in various modes of operation. These modes of operation, in one example, include a maximum workload (memory utilization high point) and a minimum or idle workload (memory utilization low point).

Default thermal characteristics depicted in table 420, for example, are based on generalized information that covers worst case scenarios. These worst case scenarios may consider typical memory module with thermal sensor configurations and make assumptions as to where the memory devices and the thermal sensor for the memory module are typically located on the memory module (e.g., at or near the center). They may also consider typical operating scenarios for modes of operation (e.g., minimum/low and maximum/high workloads) for a computing platform.

In one implementation, the thermal characteristics of table 410 are maintained by a computing platform (e.g., in BIOS tables and/or firmware) as part of the thermal information associated with the given memory module with thermal sensor configuration. The default thermal characteristics depicted in table 420, for example, are also similarly maintained by the computing platform. Also, for example, other thermal characteristics similar to those in tables 410 and 420 are associated with other given memory module with thermal sensor configurations. These other thermal characteristics, for example, are also maintained by the computing platform.

In one implementation, the thermal characteristics maintained by a computing platform (e.g., tables 410 and/or 420) are determined based on testing given memory module with thermal sensor configurations while a typical or standardized computing platform is in various modes of operation such as those mentioned above. These tests may be performed by the manufacturer of memory modules or by computing platform or chipset manufacturers. When tested for example, a test or monitoring environment is established that includes thermal sensors on each memory device of a memory module under test.

In one example, memory device thermal sensors may couple to the outside of each memory device (e.g., the memory device's case or outer packaging) and an average temperature from these sensors is collected. Another thermal sensor monitors the memory module's temperature. An average for temperatures from this other thermal sensor, for example, is also collected. Power consumed by the memory module in the given configuration, for example, is also monitored, collected and averaged for each of the modes of operation.

In one example, configuration 300 is the given configuration and this configuration includes thermal sensor 150. Testing of configuration 300, for example, includes thermal sensors (not shown) to monitor the case temperatures of each memory device 160A-D. The power consumed by memory module 160 is measured as computing platform 100 is in a given mode of operation, e.g., maximum/high or minimum/low memory workloads. As a result of the testing, for example, the thermal characteristics depicted in table 410 of FIG. 4 are determined based on the collected information.

In one example, at least some of these thermal characteristics for memory device 160A-D are depicted in table 410 as a minimum and maximum offset in degrees Celsius (° C.) and a Theta in degrees Celsius per Watt (° C./W). The minimum offset, for example, is the offset while a memory device is in a minimum (low) workload mode. The maximum offset, for example, is the offset while a memory device is in a maximum (high) workload mode. Theta, for example, indicates how the temperature offset changes for each memory device as the power consumed (in Watts) by memory module 160 increases from a minimum (low) workload to a maximum (high) workload.

In one implementation, in a run-time environment, these thermal characteristics are used to approximate a temperature of one or more memory devices 160A-D based on a temperature obtained from thermal sensor 150 that is located on memory module 160 between memory devices 160B and 160C. In one example, this approximation is in lieu of having thermal sensors at or on each memory device. The approximation may also be based on other thermal information that accounts for particular thermal characteristics of elements of configuration 300 (e.g., the resolution of thermal sensor 150, the accuracy of thermal sensor 150 and power consumed by memory module 160, power consumed by one or more memory modules 160A-D, etc.). Thermal management control for one or more memory devices 160A-D, for example, is then implemented based on the approximated temperature. The scheme to configure this thermal management control and to implement thermal management control based on an approximated temperature are described more in the example methods depicted in FIG. 5 and FIG. 6.

Figure 5:
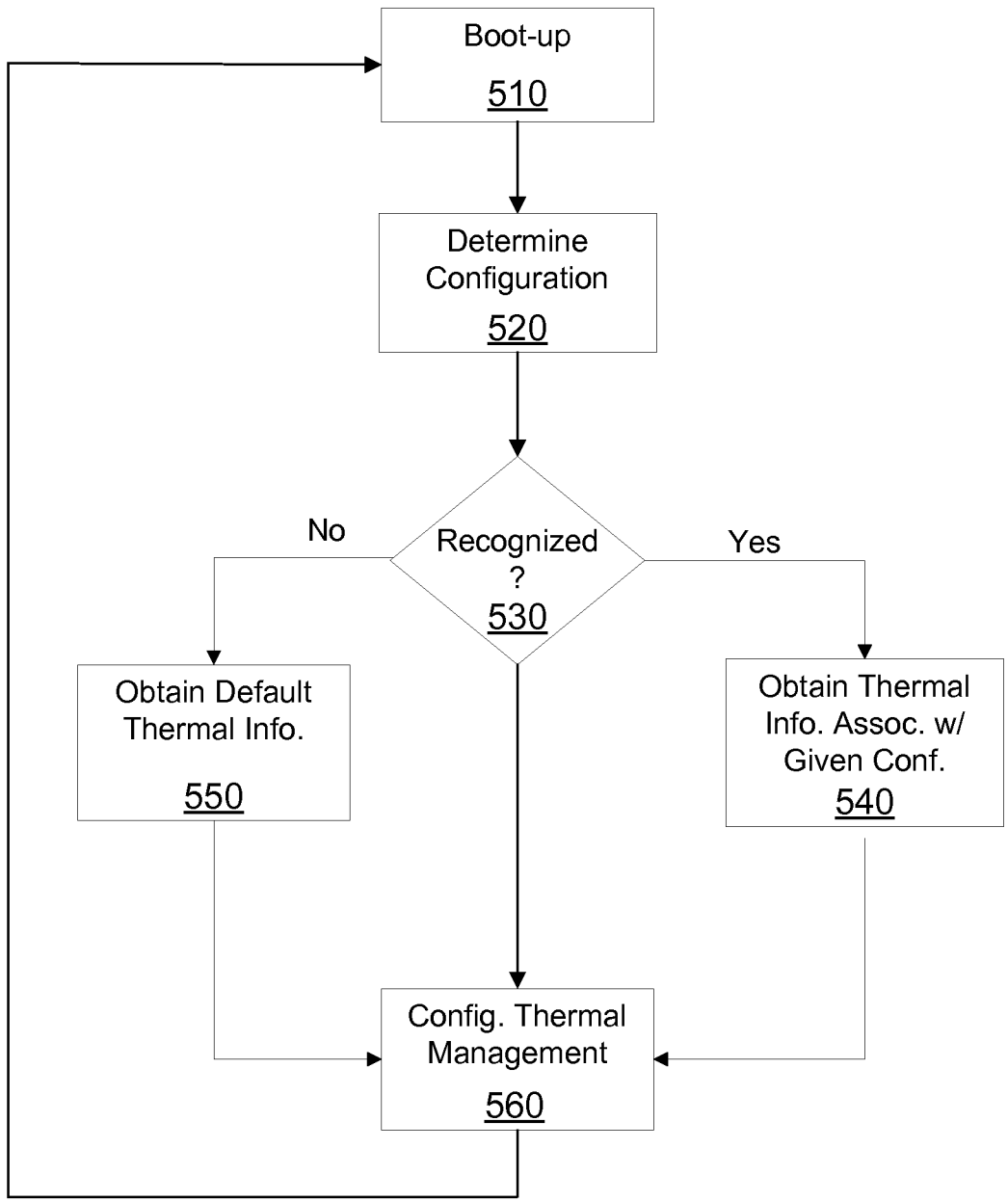
FIG. 5 is a flow chart of an example method to implement a scheme to configure thermal management control for one or more memory devices on a memory module.

FIG. 5 is a flow chart of an example method to implement a scheme to configure thermal management control for one or more memory devices 160A-D on memory module 160. In one example, computing platform 100, as depicted in FIG. 1, and configuration 300, as depicted in FIG. 3, are used to describe this method. In block 510, for example, computing platform 100 is powered-on or booted-up. This boot-up may occur as power is initially provided to computing platform 100, or incident to a reset of computing platform 100.

In block 520, in one example, upon boot-up of computing platform 100, thermal processing logic 210 in thermal manager 110 activates configuration feature 212. Configuration feature 212, in one example, obtains configuration information about memory module(s) resident on computing platform 100. This configuration information, for example, may be obtained from memory controller 140 or directly from a memory module resident on computing platform 100, e.g., from one or more capability registers associated with memory module 160. In one implementation, the obtained configuration information indicates that memory module 160 is in configuration 300 as depicted in FIG. 3. As mentioned above, in one example, configuration 300 includes memory devices 160A-D with a memory sensor 150 located between memory devices 160B and 160C.

In block 530, in one example, configuration feature 212 determines whether configuration 300 is a recognized configuration. This recognition, for example, is based at least in part on thermal information maintained by processing elements 130 of computing platform 100 in BIOS tables and/or firmware as part of the thermal information associated with one or more given memory module with thermal sensor configurations. In one implementation, these BIOS tables and/or firmware may hold thermal information for a plurality of configurations and may also hold default thermal information. As described above for FIG. 4, this thermal information may include the thermal characteristics depicted in tables 410 and/or 420.

In block 540, in one example, configuration 300 is a recognized configuration and/or matches a configuration of one or more given memory module with thermal sensor configurations that have thermal information maintained in BIOS tables and/or firmware. As described above for FIG. 4, in one example, this thermal information includes the thermal characteristics depicted in table 410. This information may also include the resolution of thermal sensor 150, the accuracy of thermal sensor 150 and power consumed by memory module 160 and/or memory devices 160A-D. Configuration feature 212, for example, obtains that thermal information and at least temporarily stores the thermal information in a memory (e.g., memory 230).

In block 550, in one example, configuration 300 is not a recognized configuration. In this example, as described above for FIG. 4, default thermal information includes the thermal characteristics depicted in table 420. This information may also include the resolution of a typical thermal sensor, the accuracy of a typical thermal sensor and power consumed by a typical memory module and/or memory device. Configuration feature 212, for example, obtains the default thermal information and at least temporarily stores that default thermal information in a memory (e.g., memory 230).

In block 560, in one example, thermal management control for memory devices 160A-D is configured based on either the default thermal information associated with an unrecognized configuration 300 or the thermal information associated with a recognized configuration 300. In one implementation, as described more in the method depicted in FIG. 6, the thermal information is used to approximate one or more memory device 160A-D's temperatures and implement thermal management control for memory devices 160A-D based on an approximated temperature.

In one example, the thermal information may also be used to determine one or more given threshold values associated with an approximated temperature. The use of these one or more given threshold values may be an aspect of thermal management control for memory devices 160A-D. This aspect, for example, acts to prevent damage to these memory devices and triggers one or more thermal management control actions if the approximated temperature for one or more memory devices exceeds at least one of the given threshold values. One threshold value, for example, may be an upper threshold value that if met or exceeded indicates that action is needed soon. Another threshold value, for example, may be a critical threshold value that if met or exceeded indicates that action is needed immediately. The critical threshold value, for example, is based on a temperature at which a memory device is likely to be damaged and/or fail.

In one implementation, an upper threshold value (Mem_upper) and a critical threshold value (Mem_critical) for each memory device 160A-D is determined based a maximum offset temperature indicated in table 410 (Max_offset), an accuracy of thermal sensor 150 (Temp_accuracy) and a guard band temperature (guard band). The guard band, for example, reduces the chances that actual memory device temperatures are not exceeded if the approximated temperature exceeds a given threshold value. Table 1 depicts example equations to determine upper and critical threshold values.

TABLE 1

Upper Threshold = Mem_upper - Max_offset - Temp_accuracy - guard band
Critical Threshold = Mem_critical - Max_offset - Temp_accuracy - guard band In one example, an accuracy for thermal sensor 150 is +/−1° C. and a guard band of 1° C. is used. In this example, a value used to determine the upper threshold value for memory devices 160A-D is 85° C. and a value used to determine the critical threshold value is 95° C. In this example, using the maximum offset from table 410 of 7.0° C. for memory device 160A and the equations in Table 1, the upper and critical threshold values are 76.0° C. and 86.0° C., respectively. Alternatively, if configuration 300 was not recognized the default information from table 420 that indicates a maximum offset of 8.0° C. is used and the upper and critical threshold values would be 75.0° C. and 85.0° C., respectively. In either case the upper and critical threshold values, for example, are at least temporarily stored by configuration feature 212 in a memory (e.g., memory 230).

The determination of these upper and critical threshold values, for example, are just one aspect of configuring thermal management control for one or more memory devices on a memory module based on a given memory module with thermal sensor configuration. This disclosure is not limited to only this aspect to configure thermal management control for these one or more memory devices on a memory module. In one example, the configuration of thermal management for one or more memory devices 160A-D starts over at block 510 based on another boot-up or incident to a reset of computing platform 100.

Figure 6:
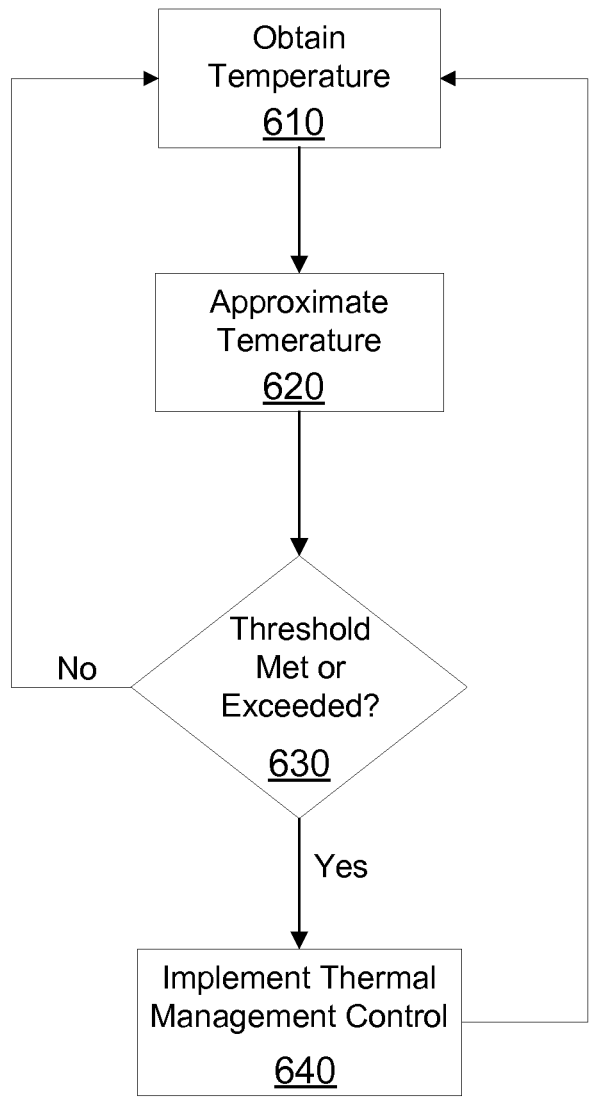
FIG. 6 is a flow chart of an example method to implement thermal management control for the one or more memory devices.

FIG. 6 is a flow chart of an example method to implement thermal management control for one or more memory devices 160A-D on memory module 160. In one example, computing platform 100, as depicted in FIG. 1, and configuration 300, as depicted in FIG. 3, are used to describe this method. Also, thermal management control for one or more memory devices 160A-D has been configured as described for the method depicted in FIG. 5.

In block 610, in one example, computing platform 100 is already booted-up and operating. In one implementation, thermal processing logic 210 activates collect feature 214. Collect feature 214, for example, obtains a temperature from thermal sensor 150 via communication link 118. Collect feature 214, for example, at least temporarily stores the temperature in a memory (e.g., memory 230).

In block 620, in one example, thermal processing logic 210 activates processing feature 216. Processing feature 216, for example, accesses or obtains (e.g., from memory 230) the thermal information associated with configuration 300. This thermal information, as mentioned above for FIG. 5, may include either default thermal information (if configuration 300 was not recognized) or thermal information associated with or specifically for configuration 300. In either case, that information and the temperature temporarily stored by collect feature 214 is used to approximate a temperature for one or more memory devices 160A-D on memory module 160. This approximation, for example, includes one or more thermal characteristics (see table 410 or 420) as well as other thermal information, e.g., thermal sensor 150's accuracy, resolution, etc.

In block 630, in one example, processing feature 216, for example, determines whether the approximated temperature meets or exceeds one or more given thresholds. If a threshold is not met or exceeded the process returns to block 610 and another temperature is obtained and approximated as described above for blocks 610 and 620.

In block 640, in one example, processing feature 216 determines that the approximated temperature met or exceeded at least one of the given threshold values (e.g., upper and/or critical). As mentioned for FIG. 5, determining these one or more given threshold values may be an aspect of configuring thermal management control for memory devices 160A-D. In one implementation, thermal processing logic 210 activates throttle feature 218. Throttle feature 218, for example, communicates or indicates to computer platform 100 elements (e.g., memory controller 140 or processing elements 130) that one or more memory devices 160A-D are meeting or exceeding the given threshold value and that thermal management control of these memory devices is needed. The process then returns to block 610 to obtain another temperature for one or more memory device 160A-D.

In one example, an approximated temperature for memory device 160D meets or exceeds one or more given threshold values. Throttle feature 218 indicates this to memory controller 140. This indication, for example, causes memory controller 140 to throttle the rate at which memory device 160D is accessed. This throttling for example, is part of the thermal management control for memory device 160D and the amount of throttling may be based on how much the given threshold value was exceeded and/or which given threshold values have been exceeded. For example, a certain amount of memory requests per unit of time contribute to memory device 160D's temperature by a certain amount. In one example, reducing or throttling the amount of memory requests per unit of time has an expected effect of reducing memory device 160D's temperature below the exceeded threshold value(s). This is only one example of how a memory controller may implement thermal management control to reduce a temperature of a memory device. This disclosure is not limited to only this example.

In one example, the given threshold values are associated with different thermal management control actions to protect memory device 160D from damage. One threshold value (e.g., upper threshold value), for example, serves as an alert that memory device 160D's temperature is rising and action is needed soon, e.g., gradual throttling of memory requests. Another threshold value (e.g., critical threshold value), for example serves as an alarm that memory device 160D's temperature has reached a critical point and action is needed immediately to prevent or minimize damage, e.g., halt all memory requests or cause the memory device to power down.

In one implementation, throttle feature 218 indicates an approximated temperature has met or exceeded one or more given threshold values for memory device 160D to elements of computing platform 100 in addition to or in lieu of memory controller 140. These other elements may include software elements of processing elements 130, e.g., an OS. This OS, for example, may implement thermal management control to reduce the temperature of memory device 160D. In one example, the OS has information that indicates that a given level of power consumed by memory device 160D is known to cause memory device 160D's temperature to rise by a certain amount. Thus, in this example, the OS, as part of the thermal management control for memory device 160D, reduces the power consumed by memory device 160D and/or transitions memory device 160D to a lower power state. This reduction in power or power state transition, for example, is expected to reduce the temperature of memory device 160D. This is only one example of how the OS may implement thermal management control to reduce a temperature of a memory device. This disclosure is not limited to only this example.

Referring again to thermal manager 110 in FIG. 1. Thermal manager 110, for example, is depicted as an element of computing platform 100 that is separate from Network interface 120, processing elements 130 and memory controller 140. In this example, thermal manager 110 may be part of or hosted on a dedicated management microcontroller such as a service processor.

In another example, thermal manager 110 resides within a grouping of computing platform 100 resources that includes memory controller 140 (e.g., a chipset). Thermal manager 110, in this other example, may be part of a dedicated management microcontroller within the chipset or may be included within or hosted on memory controller 140. Thermal manager 110, for example, obtains temperatures from thermal sensor 150 and communications with other elements of computing platform 100 through the various communication links coupled to memory controller 140.

Referring again to memory 230 in FIG. 2. Memory 230 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to memory 230 from a form of machine-accessible medium. A machine-accessible medium may represent any mechanism that provides (i.e., stores and/or transmits) information in a form readable by a machine (e.g., an ASIC, special function controller or processor, FPGA or other hardware device). For example, a machine-accessible medium may include a computer readable medium that includes: ROM; electrically erasable programmable ROM (EEPROM); RAM; magnetic disk storage media; optical storage media; flash memory devices. The machine accessible medium may also include a communication medium that includes: electrical, optical, acoustical or other form of propagated signals (e.g., carrier waves, infrared signals, digital signals) and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in this disclosure to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to," "operatively coupled to" or "interact with," although the term is not limited in his regard.

What is claimed is:

1. A method comprising:
   implementing a scheme to configure thermal management control for a memory device resident on a memory module for a computing platform, the scheme based on:
   a configuration of the memory module to include a thermal sensor to monitor the memory module's temperature; and
   thermal information associated with a given memory module with thermal sensor configuration, the thermal information including thermal characteristics, the thermal characteristics to include:
   a resolution of the thermal sensor;
   an accuracy of the thermal sensor;
   a first offset value related to the memory device in a low workload mode;
   a second offset value related to the memory device in a high workload mode; and
   a theta value related to a given increase in temperature for a given increase in power consumed by the memory device.

2. A method according to claim 1, wherein implementing the scheme to configure thermal management control for the memory device further comprises:
   determining whether the memory module matches the given memory module with thermal sensor configuration; and
   obtaining default thermal information from one or more basic input/output system (BIOS) tables maintained by the computing platform based on the memory module not matching the given memory module with thermal sensor configuration.

3. A method according to claim 2, wherein the default thermal information includes one or more default thermal characteristics, the one or more default thermal characteristics to include:
   a value related to a high temperature point for the memory device;
   a value related to an accuracy of the thermal sensor; and
   an offset value related to the memory device in a high workload mode.

4. A method according to claim 3, wherein implementing the scheme to configure thermal management control for the memory device further comprises determining a threshold value based on the one or more thermal characteristics, the threshold value to indicate implementing thermal management control for the memory device based on a temperature obtained from the thermal sensor meeting or exceeding the threshold value.

5. A method according to claim 1, wherein implementing the scheme to configure thermal management control for the memory device further comprises:
   determining whether the memory module matches the given memory module with thermal sensor configuration; and
   obtaining at least a portion of the thermal information associated with the given memory module with thermal sensor configuration from one or more basic input/output system (BIOS) tables maintained by the computing platform based on the memory module matching the given memory module with thermal sensor configuration.

6. A method according to claim 5, wherein the thermal information associated with the given memory module with thermal sensor configuration includes one or more thermal characteristics of the given memory module with thermal sensor configuration, the one or more thermal characteristics determined by:
   collecting information as the given memory module with thermal sensor configuration is in one or more modes of operation on a computing platform, collecting information to include:
   temperature of one or more memory devices resident on the memory module;
   temperature of the thermal sensor; and
   power consumed by the memory module; and
   determining the one or more thermal characteristics based on the collected information.

7. A method according to claim 6, wherein implementing the scheme to configure thermal management control for the memory device further comprises determining a threshold value based on the thermal information associated with the given memory module with thermal sensor configuration that includes the one or more thermal characteristics, the threshold value to indicate implementing thermal management control for the memory device based on a temperature obtained from the thermal sensor meeting or exceeding the threshold value.

8. A method according to claim 1, wherein the thermal sensor to monitor the memory module comprises the thermal sensor resident on the memory module.

9. A method comprising:
   obtaining a temperature from a thermal sensor monitoring a memory module on a computing platform, the memory module in a given memory module with thermal sensor configuration that includes one or more memory devices;
   approximating a temperature for a memory device of the one or more memory devices, the approximated temperature based on thermal information associated with the given memory module with thermal sensor configuration and the temperature obtained from the thermal sensor, the thermal information including thermal characteristics, the thermal characteristics to include:
   a resolution of the thermal sensor;
   an accuracy of the thermal sensor;

a first offset value related to the memory device in a low workload mode;

a second offset value related to the memory device in a high workload mode; and a theta value related to a given increase in temperature for a given increase in power consumed by the memory device; and implementing thermal management control for the memory device based on the approximated temperature.

10. A method according to claim 9, wherein implementing thermal management control for the memory device includes determining whether the approximated temperature meets or exceeds a threshold value, the threshold value based on the thermal information associated with the given memory module with thermal sensor configuration.

11. A method according to claim 9, wherein thermal management control includes at least one of: throttling memory access requests to the memory device and reducing power provided to the memory device.

12. A method according to claim 11, wherein throttling memory access requests comprises a memory controller for the computing platform reducing a rate at which the memory device is accessed over a given time period.

13. A method according to claim 11, wherein reducing power provided to the memory module comprises an operating system for the computing platform causing the memory device to transition to a lower power state.

14. A method according to claim 9, wherein approximating the temperature for the memory device based on thermal information associated with the given memory module with thermal sensor configuration and the temperature obtained from the thermal sensor comprises a theta value to determine a third offset value related to the memory device in a workload mode between the low and the high workload mode.

15. A method according to claim 14, where the workload mode between the low and the high workload mode is determined based on power consumed by the memory device.

16. A method according to claim 9, wherein the memory module in the given memory module with thermal sensor configuration comprises the memory module as a small outline dual in line memory module (SO-DIMM) with the thermal sensor resident on the SO-DIMM.

17. An apparatus comprising:
a thermal manager for a computing platform, the thermal manager to include logic to:
obtain a temperature from a thermal sensor monitoring a memory module that includes one or more memory devices, the memory module in a given memory module with thermal sensor configuration;
approximate a temperature for a memory device of the one or more memory devices based on thermal information associated with the given memory module with thermal sensor configuration and the temperature obtained from the thermal sensor, the thermal information including thermal characteristics, the thermal characteristics to include:
a resolution of the thermal sensor;
an accuracy of the thermal sensor;
a first offset value related to the memory device in a low workload mode;
a second offset value related to the memory device in a high workload mode; and
a theta value related to a given increase in temperature for a given increase in power consumed by the memory device; and
implement thermal management control for the memory device based on the approximated temperature.

18. An apparatus according to claim 17, wherein the logic to implement thermal management control for the memory device includes the logic to determine whether the approximated temperature meets or exceeds a threshold value, the threshold value based on the thermal information associated with the given memory module with thermal sensor configuration.

19. An apparatus according to claim 17, wherein the logic to implement thermal management control includes at least one of: the logic to cause a throttling of memory access requests to the memory device and the logic to cause a reduction in power provided to the memory device.

* * * * *